United States Patent [19]
Morssinkhof et al.

[11] Patent Number: 4,798,023
[45] Date of Patent: Jan. 17, 1989

[54] METHOD OF CONTROLLING ENVIRONMENTAL CONDITIONS IN THE PROXIMITY OF VEGETATION OR CROPS WITH THE AID OF PROTECTIVE SHEETING, PROTECTIVE SHEETING FOR USE IN THIS METHOD, AND A PROTECTIVE DEVICE COMPRISING SHEETING

[75] Inventors: Gerhardus H. Morssinkhof, Klimmen; Lubbertus Vogel, Uden; Adrianus Leenheer, Dordrecht, all of Netherlands

[73] Assignee: Stork Perforated Products B.V., Boxmeer, Netherlands

[21] Appl. No.: 15,330

[22] Filed: Feb. 17, 1987

[30] Foreign Application Priority Data

Feb. 14, 1986 [NL] Netherlands ............... 8600377

[51] Int. Cl.[4] ............................................. A01G 13/02
[52] U.S. Cl. ......................................... 47/26; 47/28 R; 47/31
[58] Field of Search ............... 47/28, 29, 30, 31, 26, 47/20, 21; 604/383; 804/367

[56] References Cited

U.S. PATENT DOCUMENTS

| | | | |
|---|---|---|---|
| 1,423,659 | 7/1922 | Hassel | 47/30 |
| 1,621,440 | 3/1927 | Stoddard | 47/28 |
| 3,929,135 | 12/1975 | Thompson | 604/383 |

FOREIGN PATENT DOCUMENTS

| | | | |
|---|---|---|---|
| 0167494 | 1/1986 | European Pat. Off. | 47/31 |
| 0196048 | 10/1986 | European Pat. Off. | 47/29 |
| 2452870 | 12/1980 | France | 47/31 |

*Primary Examiner*—Robert A. Hafer
*Assistant Examiner*—Kevin G. Rooney
*Attorney, Agent, or Firm*—James E. Nilles; Thomas F. Kirby

[57] ABSTRACT

A method for controlling the environmental conditions in the proximity of vegetation or crops in the cultivation of plants is described in which use is made of protective sheets comprising a large number of microperforations having each a protruded rim, said microperforations having a diameter between 50 and 2000 μm and being present in a density of between 25 and 40000 microperforations per cm². The invention also relates to plastics sheeting for use in said method and to a protective device for use in a greenhouse provided with such sheeting.

18 Claims, 4 Drawing Sheets

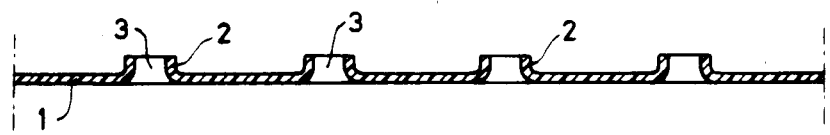
FIG: 1.
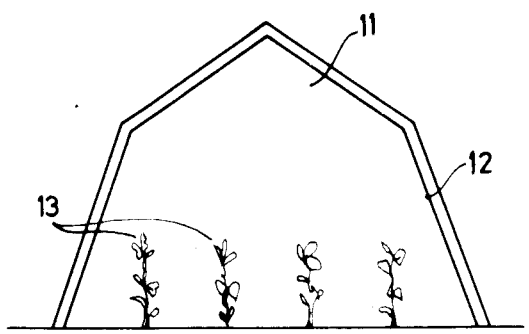
FIG: 2.
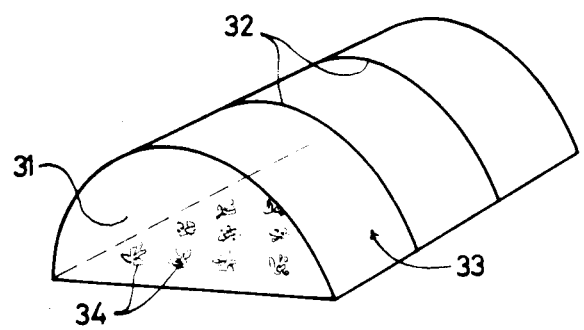
FIG: 3.

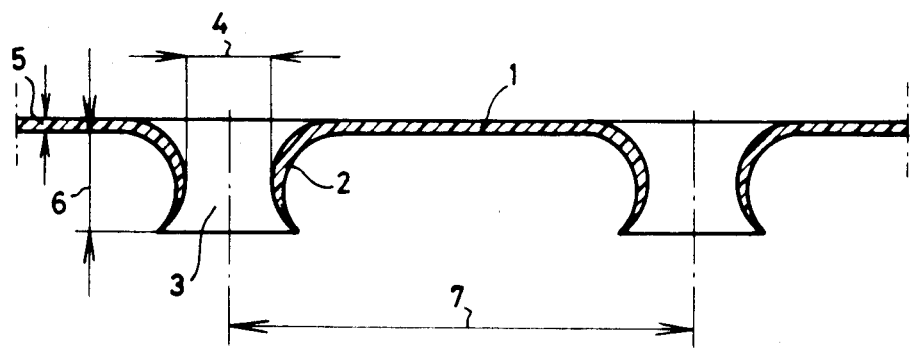
FIG: 4.

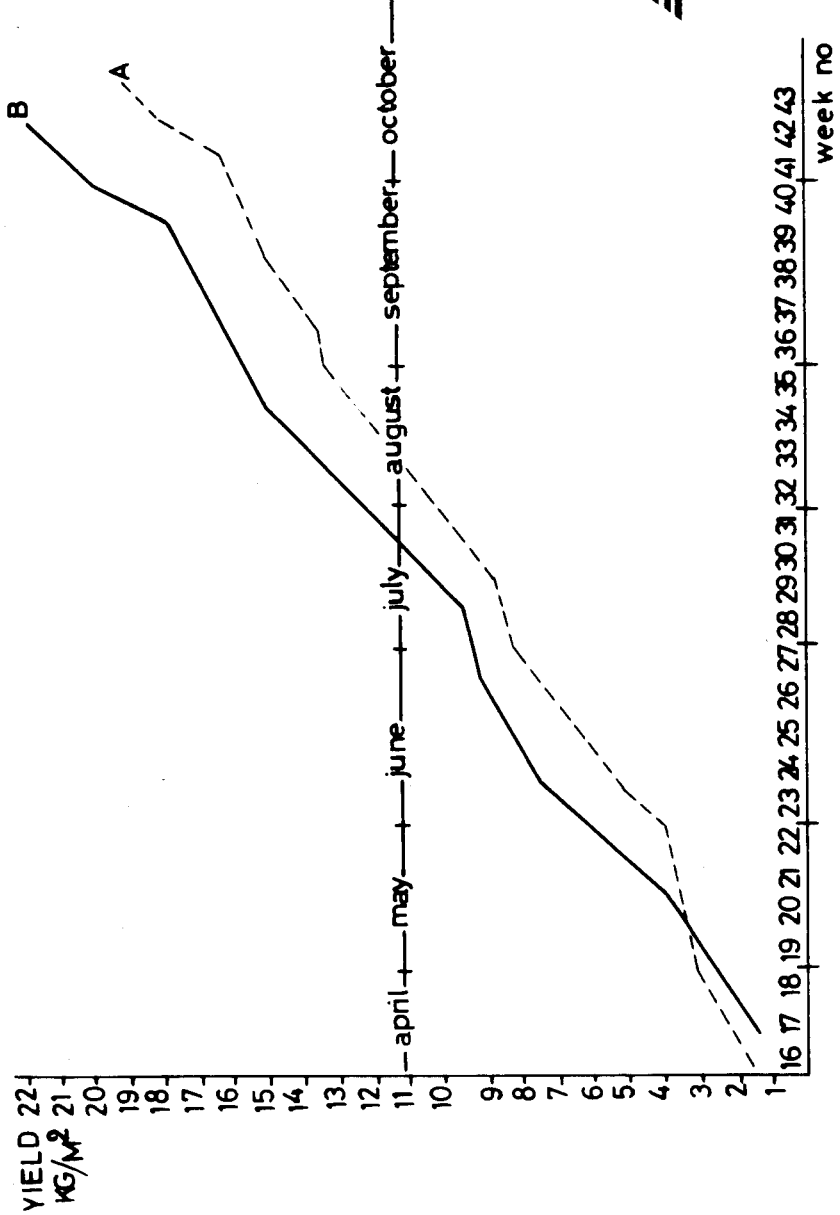

METHOD OF CONTROLLING ENVIRONMENTAL CONDITIONS IN THE PROXIMITY OF VEGETATION OR CROPS WITH THE AID OF PROTECTIVE SHEETING, PROTECTIVE SHEETING FOR USE IN THIS METHOD, AND A PROTECTIVE DEVICE COMPRISING SHEETING

BACKGROUND OF THE INVENTION

This invention relates to a method of controlling environmental conditions in the proximity of vegetation or crops in the cultivation of plants with the aid of one or more articles of manufacture in the form of protective sheets of plastics material, said sheets being provided with perforations, each perforation having a protruded rim.

The use of protective sheeting made of plastics material provided with perforations having a protruded rim as covering for cold-ground cultures, haystacks etc. is known from DE-B-1 163 596. Described is a foil and its use wherein the foil is provided with a relatively small number of perforations of relatively large dimensions whereby each perforation shows a rim which projects out of the plane of the sheeting. This foil can be used, with the perforations pointing outwards, to cover haystacks to promote drying thereof and to prevent humidification by rain.

The main purpose of such known foil however seems to be a uniform supply of air and water to the soil and to prevent at the same time excessive evaporation of soil moisture. The latter is reached by the fact that condensation of moisture will occur at the inside of a foil covering a culture area, the foil having its projections pointing inwards, and that upon saturation the condensate will be guided by the projections to flow back to the soil. Condensation of water vapour on such a material will result in drop-formation first, if the drop-formation is excessive the flowing back of water will be observed. The presence of condensate in dropform is a serious drawback as the light-transmittance is thereby reduced; such a reduction has a marked influence on the growth of the plants.

Such known foil is described to be used for open air applications only; no indication is given of its use in greenhouse cultivation. If such foil were used in greenhouse cultivation, the problem of light transmittance reduction upon condensation of water vapour would also exist. Further in greenhouse acultivation, control of humidity, temperature and luminance in times of intense sunshine is of great importance. The use of such known foil having a relatively small number of relatively large openings for the purposes as indicated does not offer any advantage.

The present invention has as a goal to provide a method as is indicated in which a plastics protective sheeting is used whereby for above given drawbacks a solution is provided and which foil may be used with advantage both in cold ground applications and in greenhouse applications.

SUMMARY OF THE INVENTION.

Aforementioned goal is according to the invention achieved by a method of the indicated type in which use is made of plastics sheeting which at least partly is provided with perforations having the form of microperforations, each of said microperforations having a protruded rim whereby the diameter of the smallest section of each microperforation has a value of between 50 and 2000 $\mu$m and the number of microperforations per unit area is between 25 and 40000 per $cm^2$. In particular use is made of plastics sheeting which at least partly is provided with microperforations having a protruded rim whereby the diameter of the smallest section is 100–1000 $\mu$m and the number of microperforations is 40–80/$cm^2$.

With use of a sheeting as indicated in the method of the invention a number of advantages is reached such as:

Moisture retention is much higher than concentional smooth foil or foil as described in DE-B-1 163 596. Up to very high humidity no dropform condensation is observed; moisture is present as a homogeneous layer on the foil between the microperforations Overall light-transmittance is substantially not influenced by the presence of condensate The presence of microperforations provides the protective sheeting with light-scattering characteristics as a result of which shadows in the vegetation are reduced and at the same time buring as a result of excessive light intensity is prevented.

The method of the invention in which use is made of sheeting with microperforations is particularly useful in greenhouse cultivation as will be described hereinafter.

In greenhouse cultivation, particularly in regions where the climate is temperate, use is made on a wide scale of protective structures constructed with one or more sheets for the purpose of restricting the radiation of heat, for example when the atmosphere cools at night. For this purpose use is made of closed sheets or sheets provided only sparingly with perforations in order to achieve the best possible thermal insulation. The sheets are applied in the form of webs, which can be rolled up, along the sides and the top of the greenhouse, so that when the sheets are completely unrolled protection is provided on all sides. Since a relatively high degree of humidity prevails in greenhouses, condensation quickly occurs when the air cools in the greenhouse, which leads to problems, particularly in the case of webs disposed horizontally above the plants. The condensate collecting on the top of the sheet, together with any water resulting from leaks, gives rise to local sagging of the sheet. In order to avoid damage to the sheeting through excessive local accumulation of water, it is customary to inspect the sheeting every morning and to pierce it in the places where water has collected. This is a time-consuming operation, while in addition the water flowing out may cause damage to the plants situated beneath it. Moreover, when cooling occurs, condensation also takes place on the lower face of the sheeting, together with locally concentrated dripping. It is known to counter this dripping by adding anti-condensation media to the material of which the sheeting is made, but these additives usually have a short working life because they diffuse out of the sheeting, while in addition the transmission of light is adversely affected by such additives.

In cultivation on cold ground the plants and the ground are in some areas protected against drying out and intensive cooling in the first growth phase by covering them with perforated sheeting. The presence of perforations are on the one hand desirable in order to ensure that rain can reach the plants and the ground under them, while on the other hand the perforations are necessary in order to permit the ventilation required for the photosynthesis process.

These known perforated sheets in use at present are smooth and have a perforation density of 500 to 1000 holes per square metre, with a passage rate of about 5 to 10% for an average hole size of about 10 millimeters.

The use of these known perforated sheets has the disadvantage that, because the large holes formed in them, the plants situated under the sheets are more easily accessible to harmful insects, while in addition damage due to extreme cold cannot be entirely prevented because of the large holes.

The present invention now seeks to provide a method whereby the favourable results of the use of the previously mentioned smooth, closed sheets and the subsequently mentioned smooth perforated sheets are combined, while however the disadvantages of the use of these two types of sheets are avoided.

Another aim of the invention is to provide a method of the kind in question which uses a protective sheet which is suitable both for applications where smooth, closed sheets are generally used and for applications in which smooth perforated sheets are used.

In addition, the invention seeks to provide a method which can be used, for example, for the drying of crops.

According to the invention these aims are achieved by a method of the abovedescribed type which is characterized in that the protective sheeting used is a plastics sheeting which is at least partially provided (FIG. 7) with microperforations (FIG. 1), each microperforation having a protruding rim. When the plastics sheeting provided at least partially with microperforations is used, it is in the first place ensured that the average light intensity in the greenhouse is higher than when a smooth unperforated sheet is used. Because of the presence of microperforations a direct increase of the light intensity is on the one hand achieved, while in addtition the presence of irregularities in the form of the projections around the perforations enables a dispersion of light to be obtained.

This dispersion of light results in reduced shading action, so that on the average the leaf surfaces receive more incident light than is the case when an ordinary smooth sheet is used.

Because of this increased intensity of light, the photosynthesis process necessary for growth is assisted.

When use is made of a plastics sheet provided at least partially with microperforations in the manner described above, it is in addition ensured in the case of greenhouse cultivation that condensed moisture will accumulate in and between the projections of the microperforations. Through the presence of the microperforations, the effective area of the sheet is in fact greatly enlarged, so that the chance of water being retained is very much greater, while in addition it is ensured that there is less tendency to drip, and the tendency for water to accumulate at lower lying parts of the sheet will be considerably reduced. The surface of the sheet is in a manner of speaking covered with a uniform thin layer of moisture with the result that during the nighttime the sheeting has an increased insulating action and the irradiation of heat is considerably reduced. During the daytime the water uniformly distributed over the surface of the sheeting will be able to be evaporated fairly quickly through irradiation with sunlight, so that the sheeting will regain its permeability. Through the use of sheeting provided with microperforations, in the case of greenhouse cultivation of plants, the condensation of water during the night will result in the formation of sheeting having relatively high thermal insulation power, while in the daytime it will have just a reduced thermal insulation power because of the evaporation of the water condensed on the sheeting during the night. The number of perforations per unit of area is in addition of such a nature that in practically all cases the permeability of the sheeting to air is retained, so that good renewal of the air lying above the plants is always ensured.

In the case of cultivation on cold ground, the presence of microperforations will ensure that the plants are well protected against harmful insects, while good circulation of air is always possible. Moreover, the microperforations can be so selected that rain falling on the sheeting will be allowed through in finely divided form, so that above the growing plants a uniform spray effect is obtained and that damage is not in any circumstances inflicted on the plants lying therebeneath by the excessively hard impingement of raindrops.

Finally, for example for the drying of plants, the sheeting provided with microperforations can be used successfully in such a form that water vapour can diffuse from the plants through the sheeting to the atmosphere, but that any incident rainwater will not pass to the interior through the perforations. This property can be achieved very simply by judicious choice of the dimensions of the perforations; with decreasing diameter of the microperforations a situation may occur in which the outwardly directed force resulting from the surface tension of water in the perforations is greater than the inwardly directed force resulting from the falling of drops of water on the sheeting. As long as the outwardly directed force is greater, the entry of rainwater will be prevented.

In the method according to the invention, all the projections in the protective sheeting used are in particular directed in the same direction relative to the plane of the sheeting (FIG. 1), and this direction in relation to the plants or crops is selected in dependence on the desired aim. Thus, for example, in the case of greenhouses an arrangement will be selected in which the projections around the microperforations will be directed towards the plants. Water condensing on the sheeting will then be deposited between the projections and in the perforations, while the flow of drops along the surface of the sheeting will be halted by the projections. When the sheeting provided with microperforations is used for cultivating plants on cold ground, it will similarly usually be ensured that the projections are directed towards the plants. Because of the desire in certain cases nevertheless to allow incident rainfall to pass through in finely divided form to the plants, the projections will likewise be inwardly directed, in order in this way to allow a certain capillary action on the part of the projections to come into effect.

For the drying of crops, on the other hand, the projections of the microperforations will generally be directed outwards (FIG. 1) in order to ensure the greatest possible discharge of water vapour to the atmosphere, while at the same time effectively stopping any tendency for water to flow into the interior.

In certain cases use is advantageously made of sheeting in which microperforations project outwards, in relation to the plants, in certain parts of the sheeting, while in certain other parts of the sheeting the perforations project inwards (FIG. 6). Sheeting of this kind is used in cases where increased circulation of air under the sheeting is desired. Because of the shape of the projections there is a certain preferred direction in the perforations for the flow of air; the presence of perforations extending in both directions in the sheeting, enables the circulation of air from outside to inside and back to be increased.

In another advantageous embodiment of the method according to the invention, sheeting is used which in addition to microperforations also has other perforations (FIGS. 8 and 9).

Cases may for example occur in which the need for rainwater for the cultivation of the plants will be very great, while on the other hand the plant must definitely be protected against the action of rainwater or hail falling with great force. In such a case it may advantageously be ensured that the sheeting is so constructed that in positions corresponding to the plants themselves microperforations are provided, while in positions corresponding for example to paths or hoeing furrows, between the plants, larger perforations are provided, all of which receive incident water. The light spray coming from the microperforated areas will thus effect the moistening of leaves, flowers and fruit, while through the capillary action from the sides of the plants water will be supplied to their roots.

The sheeting used in the method according to the invention can with particularly great advantage consist of a plastics material to which modifiers are added.

Such modifiers may be one or more pigments, agents promoting the transmission of light, agents absorbing infrared radiation, and the like. Throught the selection of the type and amount of such agents, all kinds of special effects can be achieved.

Thus, for example, in the case of very intense solar radiation, the sheeting can advantageously be pigmented, for example with the aid of titanium dioxide. In that case, of course, other types of pigment may also be used, depending on the desired effect.

The invention likewise relates to protective sheeting for use in the method described above for the control of environmental conditions in the proximity of vegetation or crops in the cultivation of plants.

Protective sheeting of this kind consists of an at least partially microperforated sheet of plastics material, in which the edges of the microperforations project out of the plane of the sheet.

It may be observed that sheeting of this kind is known per se and is used as a covering layer for a moisture absorbing material, such as for example diapers for babies or certain medical compresses. The use of sheeting of this kind for agricultural purposes has not hitherto been described.

The protective sheeting according to the invention has in particular a diameter of the smallest section of the microperforations between 50 and 1000 $\mu$m; the diameter of the perforations preferably amounts to between 100 and 1000 $\mu$m. The number of microperforations per unit area can be selected as desired, and will generally be between 25 and $4\times10^4$ perforations per square centimetre, but particularly between 100 and $10^4$ perforations per square centimetre, preferably between 100 and $10^3$ perforations per square centimetre.

Finally, the invention also relates to a protective device for use in greehouses, which comprises protective sheets, holder means for said sheets, and means for extending the sheets either under tension or otherwise, which device is characterized in that at least one of the protective sheets is provided with microperforations, while each of the microperforations has a projecting edge.

When they make use of sheets provided with microperforations, protective devices of this kind provide a noteworthy improvement in respect of heat, moisture and light economy in the greenhouses in which they are used.

BRIEF DESCRIPTION OF THE DRAWINGS

The invention will now be explained with the aid of the drawings, in which:

FIG. 1 is a section of a sheet which is to be used in the method according to the invention and which is provided with microperforations, each of the latter having an outwardly projecting edge.

FIG. 2 is a section of a glass greenhouse provided along its walls with sheeting having microperforations.

FIG. 3 shows an arrangement for cultivation on cold ground with the aid of plastics sheeting provided with microperforations.

FIG. 4 shows a single microperforation on an enlarged scale, as present in the sheet of FIG. 1.

FIG. 5 shows a graph illustrating the yields of product in an experiment in greenhouse cultivation of paprika with use of two types of protective sheeting.

In FIG. 1 the reference numeral 1 designates a sheet which is provided with microperforations, each of which has an outwardly projecting edge 2 surrounding the microperforation 3. A sheet of this kind is produced in known manner by bringing thermoplastic sheeting into contact with a metal surface provided with microperforations, heating said surface, and producing on the inner side of the metal surface a vacuum by means of which the plastics sheet is drawn into the microperforations and deformed, the deformation being allowed to continue until holes are formed in the sheet at the sites of the perforations. After the sheet has been removed from the metal surface provided with microperforations and has cooled, the sheet designated 1 results.

FIG. 2 shows schematically a greenhouse having glass walls 11, along which plastics sheeting 12 provided with microperforations is stretched. The plants 13 are protected at night through the presence of the plastics sheeting provided with microperforations against intense cold caused by irradiation of heat, which is greatly retarded by plastics sheeting, while during the daytime, after the evaporation of the water condensed during the night, the sheeting resumes its original less intensive insulating action. In this figure the sheeting is shown close to the glass walls. It is obvious that at the discretion of the user such sheeting may also be disposed in other places or in other positions. In addition, the sheeting may be arranged to be movable, so that at certain times of the day the sheeting can if desired be entirely removed from the surface receiving the radiation of the sun, or can be appropriately disposed.

FIG. 3 shows a situation in which the sheeting is used for cultivating plants on cold ground. There is a space bounded by hoops and sheeting. The sheeting 31 is stretched over hoops 32, while 34 indicates schematically the plants being cultivated. As previously stated, it can be ensured through selection of the dimensions of the perforations that on the one hand good circulation of air is achieved and that on the other hand direct damping by incident rain is avoided, or the rain is distributed in the form of a harmless mist.

Figure 6:
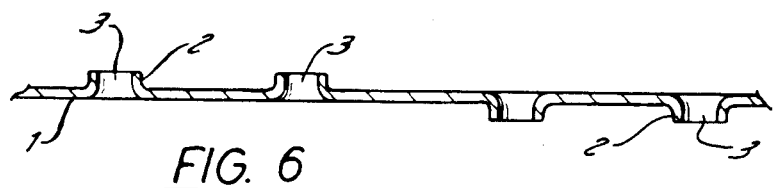
FIG. 6 shows a sheet, similar to that in FIG. 1, but having microperforations extending in opposite directions from one another.
Figure 7:
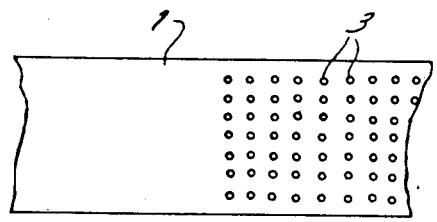
FIG. 7 shows a sheet which is at least partially provided with microperforations.
Figure 8:
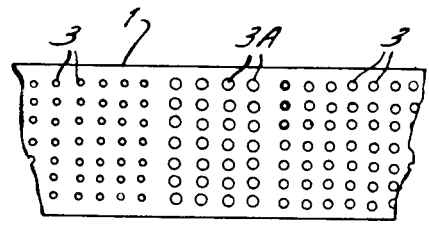
FIGS. 8 and 9 each show a sheet which is provided with microperforations and also with other larger perforations.
Figure 9:
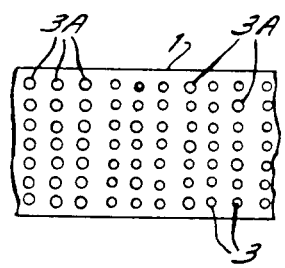

In addition, the projections on the sheeting may all be directed inwards, or else some of the perforations may be directed inwards and others be directed outwards in order to ensure increased circulation of air, as shown in FIG. 6. Finally, as previously indicated, perforations 3A of a larger diameter, for example 10 millimeters, may also be provided in the sheeting in order to achieve complete admission of incident rain in certain places, as shown in FIGS. 8 and 9.

In the abovedescribed arrangement for cultivation on cold ground it is also possible to dispense with the use of hoops. The sheeting then comes into direct contact with the plants, and, as the plants grow, will in the course of time be lifted higher off the ground; in this case the sheeting used is called co-growth sheeting.

In FIG. 4 the same reference numerals are used for the same parts as in FIG. 1. A microperforation 3 has a diameter of its smallest section 4; the thickness of the sheeting is 5; the height of protrusion is 6 and the pitch of perforations is given by 7.

As FIG. 4 best shows, each microperforation 3 extends through sheet 5 and is bounded by the protruding rim or outwardly projecting edge 2 which is curved on its interior and exterior sides so that a microperforation 3 takes the form or shape of a venturi which has outwardly flairing divergent end portions connected by a constricted middle or waist portion. The smallest diameter 4 is that of the constricted middle or waist portion of microperforation 3 and the flairing ends are of larger diameter.

In a specific example the sheeting has a thickness 1 of 40 $\mu$m; the diameter 4 is 560 $\mu$m on average; the protrusion height 6 is 530 $\mu$m on average and the pitch 7 is chosen such that the open area is 15%.

FIG. 5 will be explained in the following example.

DESCRIPTION OF A PREFERRED EMBODIMENT p Example

In a greenhouse complex paprika's were cultivated on a conventional substrate of mineral wool with use of a conventional nutrition solution. Two completely separated sections were present. One section was provided with the conventional protective sheeting being polyethylene sheet, thickness 40 $\mu$m and provided with the conventionally used anti-condensation agent. The other section was equipped with protective sheeting as per the method of the invention; i.e. low density polyethylene film, 40 $\mu$m thickness comprising 2% ethylenevinylacetate, UV-degradation inhibitor and an open area of 15%, having microperforations with a smallest diameter of 560 $\mu$m in a concentration of about 60 microperforations/cm$^2$ over the whole area over the sheeting.

Heating of the greenhouse sections was carried out with use of a conventional system comprising polyethylene tubing below the substrates, tube heating above ground level and additional air-heating.

The protective foils were movably mounted in order to be able to vary the protected area, as is also customary in greenhouse cultivation.

Both heating and optionally cooling and movement of the protective sheeting; as well as the addition of nutrition liquid were computer-controlled; the control being in accordance with the difference between predetermined respective desired values of the different parameters and the measured values of these parameters such as temperature, humidity, luminance etc..

The test was carried out in the Westland-area of the Netherlands in the period from November 1985 to November 1986.

In the accompanying graph is given the cumulated yield in kg/m$^2$ for section A provided with conventional protective sheeting and section B with the protective sheeting according to the invention. The increase in yield is very marked, in week 42 B has reached about 22 kg/m$^2$ whereas A has reached about 19 kg/m$^2$, an increase of about 15%. In the beginning of the period the results in project B did lag behind as a result of the increase in number of buds and fruits to be nourished and a two weeks later planting date; this retardations were made up in the remaining season and the yield even increased as a result of the good light transmittance of the foil in the period with limited duration of daylight.

Humidity control appeared to be more easy in the case of project B than in project A; the percentage open area chosen, 15%, appeared to be somewhat at the high side in circumstances of low humidity outside the greenhouse.

By experimenting an optimum value of the percentage open area has to be established; the optimum reached will be depending on the type of vegetation; greenhouse environment, sun-hours etc.

The sheeting used in project B did exhibit a very good water retention; experiments showed that the sheeting could absorb up to 30 g/m$^2$ more water in a homogenous film without formation of drops than the sheeting of project A was able to take up.

Whereas normal foil (A) showed already in an early stage drop-condensation at its surface, the sheeting of the invention (B) did show practically no drop-condensation up to high relative humidities. Drop-condensation has a marked effect on the light-transmittance, the sheeting of the invention therefore shows a constant transmittance which is substantially not influenced by relative humidity of the greenhouse atmosphere.

Particularly in the early hours, when the outside temperature is still low, the closed foil of section A had to be opened to lower the unadvantageously high relative humidity and to prevent absorption of light by the accumulated condensation droplets on the lower side of the screen, with a subsequent loss of heat.

The perforated foil of section B seemed to be markedly in favour with respect to the foil in section A, in that it could remain closed for a longer time thereby providing heat insulation as well as good light-transmission.

As a result of the presence of the microperforations in the sheeting of project B a more uniform luminance was observed in comparison to project A; the protruded rims of the microperforations give the sheeting a scattering foil effect.

The foil of section B therefore shows very good possibilities to be used as a protective sheet against sunburn, particularly in high-temperature regions.

The sheeting used in section B, finally, showed a very good ductility and softness in comparison to conventional sheeting of project A, leading to a favourably small diameter roll of foil when it is in removed condition.

This condition is of importance because of the fact that in view of shadow prevention the foil pack is required to be as small as possible.

What is claimed is:

1. As an article of manufacture, a protective sheet for use in the cultivation of plants for controlling environmental conditions in the proximity of said vegetation or crops, said protective sheet being fabricated of flexible translucent plastic material, said protective sheet having opposite sides and being provided with a plurality of microperforations, each of said microperforations having flaired end portions connected by a constricted middle portion and defined by a protruded rim which is curved on its interior and exterior sides for dispersing light and guiding water on said sheet, and wherein the diameter of the smallest section of each microperforation at the constricted middle portion has a value of between 50 and 2000 $\mu$m and the number of microperforations per unit area is between 25 and 40000 per $cm^2$.

2. An article of manufacture according to claim 1, in which all protruded rims of microperforations extend from one side of said sheet in the same direction in relation to the plane of said protective sheet.

3. An article of manufacture according to claims 1, in which the protruded rims of some microperforations extend from one side of said protective sheet, and the protruded rims of other microperforations extend from the other side of said protective sheet.

4. An article of manufacture according to claim 1, in which said protective sheet is provided with said microperforations and with other perforations of larger diameter than said microperforation.

5. An article of manufacture according to claim 4 wherein said other perforations are located in a region of said sheet which also contains microperforations.

6. An article of manufacture according to claim 4 wherein said other perforations are located in a region of said sheet which does not contain microperforations.

7. An article of manufacture according to claim 4 wherein said other perforations are located in a region of said sheet which contains microperforations and in a region which does not contain microperforations.

8. An article of manufacture according to claim 1, in which said protective sheet is made of plastic material to which modifiers are added which affect the light-transmitting characteristics of said sheet.

9. An article of manufacture according to claim 1 or 2 or 3 or 4 or 5 or 6 or 7 in which said protective sheet is provided with microperforations having a protruded rim, and wherein the diameter of the smallest section is 100–1000 $\mu$m and the number of microperforations is 40–80/$cm^2$.

10. Protective device for use in greenhouses, which comprises protective sheets, holders for said sheets, and means for extending the sheets, under tension or otherwise, characterized in that at least one of the protective sheets is provided with microperforations, each of the latter having a projecting rim, said protective sheet being fabricated of flexible translucent plastic material and having opposite sides, each of said microperforations having flaired end portions connected by a constricted middle portion and defined by said projecting rim which is curved on its interior and exterior sides for dispersing light and guiding water on said one protective sheet, and wherein the diameter of the smallest section of each microperforation at the constricted middle portion has a value of between 50 and 2000 $\mu$m and the number of microperforations per unit area is between 25 and 40000 per $cm^2$.

11. A method for use in the cultivation of plants for controlling environmental conditions in the proximity of vegetation or crops comprising the steps of:

providing a protective translucent flexible plastic sheet having opposite sides and having a plurality of microperforations therein, each of said microperforations having flaired end portions connected by a constricted middle portion and defined by a protruded rim which is curved on its interior and exterior sides therearound which extends outwardly from a side of said sheet to disperse light and guide water, the diameter of the smallest section of each microperforation at the constricted middle portion having a value of between 50 and 2000 $\mu$m and the number of microperforations per unit are being between 25 and 40000 per $cm^2$;

and disposing said sheet over said vegetation or crops as at least part of a protective covering completely shielding said vegetation or crops from the outside world's direct influence.

12. A method according to claim 11 wherein said sheet is disposed over said vegetation or crops so that the protruded rims are directed towards said vegetation or crops.

13. A method according to claim 11 wherein said sheet is disposed over said vegetation or crops so that the protruded rims are directed away from said vegetation or crops.

14. A method according to claim 11 wherein, in the protective plastic sheet provided, some protruded rims project from one side of said sheet and other protruded rims project from the opposite side of said sheet.

15. A method according to claim 11 or 12 or 13 or 14 wherein said protective plastic sheet comprises is provided with other perforations, of larger diameter than said microperforations.

16. A method according to claim 15 wherein said other perforations are located in a region of said sheet which also contains microperforations.

17. A method according to claim 15 wherein said other perforations are located in a region of said sheet which does not contain microperforations.

18. A method according to claim 15 wherein said other perforations are located in a region of said sheet which contains microperforations and in a region which does not contain microperforations.

* * * * *